(12) United States Patent
Wall

(10) Patent No.: US 10,087,978 B2
(45) Date of Patent: Oct. 2, 2018

(54) PERFORATED HARDBOARD GROMMET AND FIXTURE SECURING SYSTEM

(71) Applicant: PEGITZ, LLC, San Diego, CA (US)

(72) Inventor: Stephen Wall, San Diego, CA (US)

(73) Assignee: PEGITZ, LLC, San Diego, CA (US)

(*) Notice: Subject to any disclaimer, the term of this patent is extended or adjusted under 35 U.S.C. 154(b) by 0 days.

(21) Appl. No.: 15/158,506

(22) Filed: May 18, 2016

(65) Prior Publication Data

US 2016/0341232 A1    Nov. 24, 2016

Related U.S. Application Data

(60) Provisional application No. 62/163,495, filed on May 19, 2015.

(51) Int. Cl.
| | |
|---|---|
| *F16M 11/00* | (2006.01) |
| *F16B 45/00* | (2006.01) |
| *B25H 3/04* | (2006.01) |
| *A47F 5/08* | (2006.01) |
| *A47B 47/04* | (2006.01) |
| *F16B 21/08* | (2006.01) |

(52) U.S. Cl.
CPC .......... *F16B 45/00* (2013.01); *A47B 47/042* (2013.01); *A47F 5/0823* (2013.01); *B25H 3/04* (2013.01); *F16B 21/086* (2013.01)

(58) Field of Classification Search
USPC ................................................. 248/220.31
See application file for complete search history.

(56) References Cited

U.S. PATENT DOCUMENTS

| | | | | |
|---|---|---|---|---|
| 1,202,503 A | * | 10/1916 | Fortier | F16B 37/045 248/222.52 |
| 3,033,624 A | * | 5/1962 | Biesecker | F16C 11/04 174/153 G |
| 3,154,281 A | * | 10/1964 | Frank | F16B 21/06 174/138 G |
| 3,193,231 A | * | 7/1965 | Curry | A47F 5/0823 24/DIG. 52 |
| 3,198,469 A | | 8/1965 | Callanan | |
| 3,241,799 A | | 3/1966 | Terlinde | |
| 3,378,219 A | * | 4/1968 | Biesecker | F16B 9/02 211/123 |
| 3,625,464 A | * | 12/1971 | Conran | A47F 5/0823 248/220.43 |
| 3,688,635 A | * | 9/1972 | Fegen | F16B 21/082 174/138 A |

(Continued)

*Primary Examiner* — Monica E Millner
(74) *Attorney, Agent, or Firm* — Coastal Patent Law Group, P.C.

(57) ABSTRACT

The disclosure concerns grommets for use with a perforated hardboard system. The grommets are each configured to fit securely into a hole of the perforated hardboard for protecting the surface integrity of hole and to provide an improved fitment of hooks and fixtures therein. The grommets enhance longevity of the perforated hardboard system. In addition, the grommets can be used to stabilize an orientation of a hook or other fixture for improved organization and added customization options. As an added utility or benefit of the disclosed grommet, upon removing an object hanging from a fixture of the perforated hardboard system, the fixture will remain in place and not fall out of configuration with the perforated hardboard.

15 Claims, 11 Drawing Sheets

(56) References Cited

U.S. PATENT DOCUMENTS

| | | | | |
|---|---|---|---|---|
| 4,063,648 A * | 12/1977 | Fuller | ............ | A47F 7/163 211/113 |
| 4,103,854 A * | 8/1978 | Pliml | ............ | F16B 5/0685 248/222.11 |
| 4,303,217 A | 12/1981 | Garfinkle | | |
| 4,531,697 A * | 7/1985 | Steiner | ............ | A47F 5/0807 248/220.43 |
| 4,923,161 A * | 5/1990 | Fahringer | ............ | A47F 5/0823 248/220.43 |
| 4,941,632 A | 7/1990 | Couls | | |
| 4,952,106 A * | 8/1990 | Kubogochi | ............ | F16B 19/1081 411/48 |
| 5,109,993 A * | 5/1992 | Hutchison | ............ | A47F 5/0846 211/59.1 |
| 5,163,795 A * | 11/1992 | Benoit | ............ | F16B 19/1081 411/41 |
| D332,047 S * | 12/1992 | Kluk | ............ | D8/367 |
| 5,375,954 A * | 12/1994 | Eguchi | ............ | F16B 19/1081 411/41 |
| 5,407,160 A * | 4/1995 | Hollingsworth | ............ | A47F 5/0823 248/220.43 |
| 5,607,132 A * | 3/1997 | Baldwin | ............ | A47F 5/0823 248/220.42 |
| 6,266,250 B1 * | 7/2001 | Foye | ............ | H05K 7/12 211/41.17 |
| 6,374,455 B1 * | 4/2002 | Regele | ............ | F16L 5/10 16/2.1 |
| 6,443,316 B1 * | 9/2002 | Mao | ............ | A47F 5/0807 211/41.3 |
| 6,574,924 B2 * | 6/2003 | Maniezzo | ............ | A47F 5/0823 211/90.01 |
| 6,769,656 B1 * | 8/2004 | Botkin | ............ | A47F 5/0823 211/57.1 |
| 6,769,849 B2 * | 8/2004 | Yoneoka | ............ | F16B 5/0642 411/41 |
| 7,131,806 B2 * | 11/2006 | Hansen | ............ | F16B 5/0258 248/220.31 |
| 7,354,024 B2 | 4/2008 | Winig | | |
| 8,522,986 B2 * | 9/2013 | Kitchen | ............ | A47F 5/0815 211/59.1 |
| 2009/0090828 A1 * | 4/2009 | Junkins | ............ | A47G 25/10 248/220.21 |
| 2010/0212462 A1 * | 8/2010 | Anderson | ............ | A47F 5/0823 81/121.1 |

\* cited by examiner (section A-A)

PERFORATED HARDBOARD GROMMET AND FIXTURE SECURING SYSTEM

CROSS-REFERENCE TO RELATED APPLICATIONS

This application claims benefit of priority with U.S. Provisional Ser. No. 62/163,495, filed May 19, 2015; the contents of which are hereby incorporated by reference.

BACKGROUND OF THE INVENTION

Field of the Invention

This invention relates to perforated hardboard accessories; and more particularly, to a grommet configured for insertion into holes of a perforated hardboard for securing hooks and other fixtures of a perforated hardboard system.

Description of the Related Art

Perforated hardboards are tempered hardboards, generally made of wood fibers that come pre-drilled, often with evenly spaced holes. These holes are used to insert perforated hardboard accessories, including hooks and other hanging and organizational fixtures, inter alia, wherein the perforated hardboard and installed accessories primarily are used to organize and store various items, such as tools and the like. The perforated hardboard and accessories, collectively a "perforated hardboard system", is generally secured to a wall; however, the perforated hardboard system may alternatively be secured using a myriad of other means, such as with a stand, integration with a cart or tool chest, or by hanging from a ceiling. Perforated hardboard systems are usually mounted or otherwise placed in utility areas of a household, such as a garage, storage shed or workshop, as well as in retail settings in order to hang or display merchandise.

A common problem arises when utilizing hooks with a perforated hardboard, for one example, the hooks tend to fall out of the perforated holes and are inadvertently removed when removing hanging items from the hardboard. Often the hooks become lost or the tool or other instrument hanging via the hook is unstable. This problem often occurs due to an improper fitment or a lack of secure fastening of the hook within the hole. Additionally, with the storage of heavy objects on the hooks, and further, with regular use of the perforated hardboard system, constant removal of the hooks causes wearing of the edges of the hole, which over a period of time often results in excessive wear, fatigue, and the inability for a spent hole to maintain proper hole shape and integrity for continued use. Thus, there is a need to improve the overall longevity of the holes of the perforated hardboard.

Conventional solutions have provided straps for securing a hook to the perforated hardboard in order to prevent the inadvertent removal of the hook when removing items from the perforated hardboard system. In general, these straps utilize the adjacent holes on either side of the hook in order to the secure the hook to the board, decreasing the number of available holes for use. These straps also make removal of the hook inconvenient and cause damage to the surrounding holes.

Other alternatives to the hardboard material include either plastic or metal perforated boards. Though these boards are more durable, they are heavier to hang, more costly and would require a person to replace their already purchased wooden hardboard.

Since perforated hardboards are commonly found in many everyday households and retail establishments, there is a present need for an improvement which provides a tight and secure fit for the hooks and other fixtures.

SUMMARY OF THE INVENTION

In accordance with various embodiments, a grommet is proposed for use with a perforated hardboard system. In accordance with the various described embodiments, the grommet is configured to fit securely into a hole of the perforated hardboard. The grommet is configured to protect the surface integrity of holes and enhances longevity of the perforated hardboard system. In addition, the grommet can be used to stabilize an orientation of a hook or other fixture for improved organization and added customization options. As an added utility or benefit of the disclosed grommet, upon removing an object hanging from a fixture of the perforated hardboard system, the fixture will remain in place and not fall out of configuration with the perforated hardboard.

In accordance with an embodiment, the grommet includes at least: a cylindrical body having a circular cross-section extending along a longitudinal axis from a rear side to a front side, the circular cross-section includes an outer diameter that is less than the hole diameter of a perforated hardboard hole, and a stopping flange attached to the cylindrical body portion at the front side thereof, the stopping flange extending radially outward from a front side of the cylindrical body in a direction perpendicular to the longitudinal axis.

In certain embodiments, the rear side of the grommet further includes a rear securing element for securing the rear side of the grommet to a rear surface of the perforated hardboard. The rear securing element may include one or more tabs, a circular flap, or other securing element.

In certain other embodiments, the grommet may be fixed in a particular hole once installed, while in other embodiments the grommet may be configured for removal, such that when removed, the grommet may be re-positioned and placed on any hole as-desired.

The rigid stopping flange may further include one or more slots configured for receiving and retaining a hook or other fixture, or a portion thereof, for maintaining orientation of the hook or fixture.

Other features and advantages will be further described in the appended detailed description of the preferred embodiments.

BRIEF DESCRIPTION OF THE DRAWINGS

FIG. 13E shows a top view of the grommet in accordance with the preferred embodiment, the left and right sides are similar.

DETAILED DESCRIPTION OF THE PREFERRED EMBODIMENTS

Figure 1A:
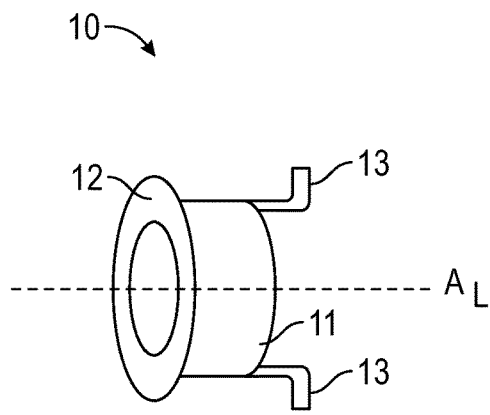
FIG. 1A shows a perspective view of a grommet in accordance with an embodiment, wherein a side profile is depicted.

In the following description, for purposes of explanation and not limitation, details and descriptions are set forth in order to provide a thorough understanding of the embodiments of the invention. However, it will be apparent to those skilled in the art that the present invention may be practiced in other embodiments, including certain variations or alternative combinations that depart from these details and descriptions.

First, while wood hardboards have long been the most common type of perforated hardboards available in commerce, more recently, metal and plastic perforated hardboards have surfaced in the market. It should be understood that this invention is adaptable to any such perforated hardboard, whether fabricated from wood, metal, plastic or other material.

Now, in a general embodiment, a grommet is provided for insertion into one of a plurality of holes associated with a perforated hardboard (also known as a "pegboard"). The grommet includes at least a cylindrical body having a circular cross-section extending along a longitudinal axis from a rear side to a front side, the circular cross-section includes an outer diameter that is less than the hole diameter of a perforated hardboard hole, and a stopping flange attached to the cylindrical body portion at the front side thereof, the stopping flange extending radially outward from a front side of the cylindrical body in a direction perpendicular to the longitudinal axis. The cylindrical body is configured to at least partially extend through the hole of the perforated hardboard. The grommet further includes a securing element extending from a rear side and configured to lock the grommet in position when installed in the hole of the perforated hardboard.

In certain other embodiments, the grommet may include a cylindrical body portion extending along a longitudinal axis, and a flange extending radially from the cylindrical body portion at a front side thereof. The grommet can be configured with an outer diameter sufficient to nest within a hole of perforated hardboard by way of a friction fitment. In this embodiment, the grommet does not include a securing element positioned on the rear side of the grommet. As an option, the cylindrical body may comprise a texture on at least one of the inside and outside surfaces of the cylindrical body portion, or about at least a portion of a surface area associated with the flange, such that the texture may be configured to provide a friction grip about the hole or surface of the perforated hardboard.

In various embodiments, the cylindrical body portion may include one or more slots extending longitudinally about the cylindrical body portion each forming a discontinuous part of the cylindrical body. In this regard, the cylindrical body portion may be formed of two halves each separated by a pair of slots, or a single slot may extend the longitudinal length of the cylindrical body portion. In other embodiments, the cylindrical body portion is essentially an extruded circle extending along the longitudinal length of the body portion.

The cylindrical body portion may further comprise texture on an inside surface for improved fixture retention or gripping. The texture may include bumps or ridges formed along at least a portion of the inside surface.

The cylindrical body may comprise a tapered cylinder having a first diameter at a front end thereof and a second diameter at a rear end thereof, wherein the second diameter is less than the first diameter creating a tapered cylindrical body portion.

Additionally, the cylindrical body portion may comprise one or more cut-outs, holes, or voids for providing an optimal fit within a hole of a perforated hardboard.

The grommet is configured to securely nest within a hole of the perforated hardboard, and to receive a hook or other fixture through an aperture extending through the grommet. When using the grommet with the perforated hardboard, the inserted hook or fixture is engaged with improved fitment. Further, when removing an object from the hook or other fixture secured to the perforated hardboard with the grommet, the hook or fixture does not fall out or shift out of the installed orientation.

The grommet can be manufactured and designed in a myriad of possible configurations. Certain preferred embodiments are being disclosed herein, while others will be apparent to those having skill in the art.

Now turning to the drawings, FIGS. 1(A-D) show the grommet as part of a perforated hardboard system including a perforated hardboard and the grommet installed in a hole thereof.

FIG. 1A shows a perspective view of a grommet 10 in accordance with an embodiment showing a side profile thereof. The grommet comprises a body portion 11 extending along a longitudinal axis ($A_L$). A flange 12 is attached to the cylindrical body 11 at a front side of the grommet, the flange extends radially outwardly from the body in a direction perpendicular to the longitudinal axis. From a rear of the body 11 extends one or more securing elements, which may include tabs 13. The embodiment of FIG. 1A shows a pair of tabs 13 extending from the rear side of the body. Although tabs are illustrated in the instant figure, other variations of securing elements will be illustrated in other figures herein.

In some embodiments, the tabs may be tapered from one end to another to facilitate bending and spring bias.

Figure 1B:
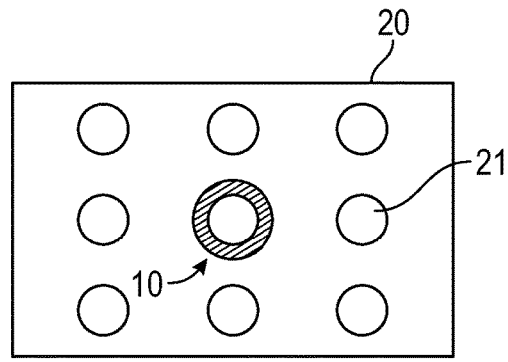
FIG. 1B shows a front view of a perforated hardboard having a grommet installed in one hole thereof.

FIG. 1B shows a front view of a perforated hardboard 20 having the grommet 10 installed in one hole of a plurality of holes 21 of the perforated hardboard.

Figure 1C:
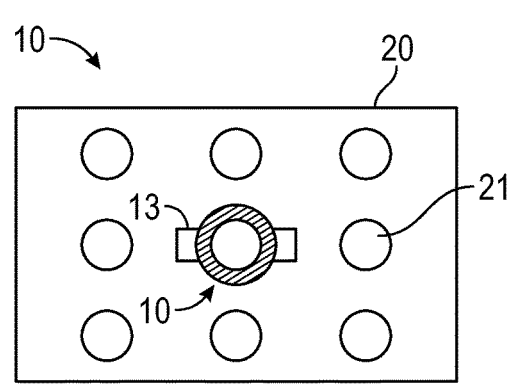
FIG. 1C shows a rear view of the perforated hardboard having a grommet installed the one hole.

FIG. 1C shows a rear view of the perforated hardboard 20 having a grommet 10 installed the one hole of the plurality of holes 21. The securing elements, here tabs 13, are shown extending outwardly and behind the perforated hardboard.

Figure 1D:
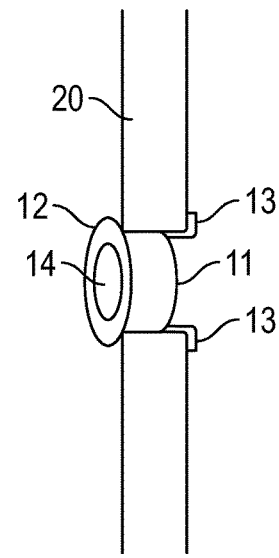
FIG. 1D shows a side view of the perforated hardboard and installed grommet.

FIG. 1D shows a side view of the perforated hardboard 20 and installed grommet. The grommet body 11 is shown engaging an interior surface of the hole. The flange 12 abuts a front surface of the perforated hardboard 20. Rear securing elements, here tabs 13, extend from a rear side of the body 11 of the grommet and engage a rear surface of the perforated hardboard 20. An aperture 14 extends through the grommet and is configured to receive a hook or other fixture therethrough.

Figure 2A:
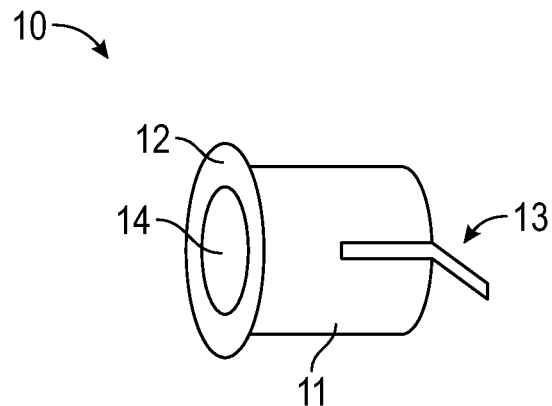
FIG. 2A shows a grommet in accordance with another embodiment.

FIG. 2A shows a grommet in accordance with an embodiment. In the instant embodiment, the grommet 10 includes a body portion 11 and a flange 12 extending perpendicular from the body at a front side of the grommet. A securing element includes a tab 13 that is configured to depress into a channel within the cylindrical body portion when inserting into the hole of the perforated hardboard. In this regard, the channel is configured such that the tab enters a volume thereof during insertion. Once the grommet is inserted, a memory bias provides the tab an ability to retract from the channel and engage with a rear surface of the perforated hardboard. An aperture 14 extends through the grommet and is configured to receive a hook or other fixture therethrough.

In some embodiments, the tabs may be biased to extend into a lumen of the cylindrical body portion, and as the fixture or hook is inserted therein, the tabs are pushed outwardly through the channel such that the tabs are configured to engage a rear side of the perforated hardboard.

Figure 2B:
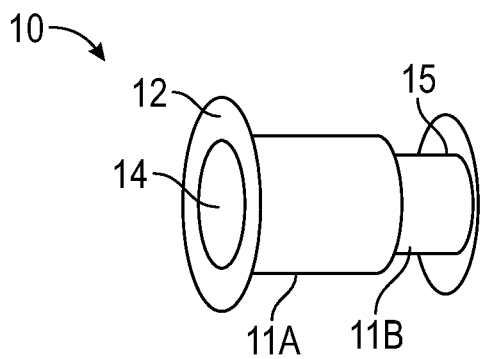
FIG. 2B shows a grommet in accordance with another embodiment.

FIG. 2B shows a grommet in accordance with another embodiment. Here, the grommet 10 includes a body having a first portion 11A and a second portion 11B, the second portion comprises a second diameter that is less than a first diameter associated with the first portion of the body. The grommet further comprises a circular flap 15 extending form a rear side of the body at the second portion thereof. The flap is configured to fold over the second portion of the body during insertion into a hole of the perforated hardboard, and upon installation the flap is biased to extend behind the hole for engaging the rear surface of the perforated hardboard. The grommet further comprises a flange 12 extending from the body first portion 11A at the front side of the grommet. An aperture 14 extends through the grommet and is configured to receive a hook or other fixture therethrough.

Figure 3A:
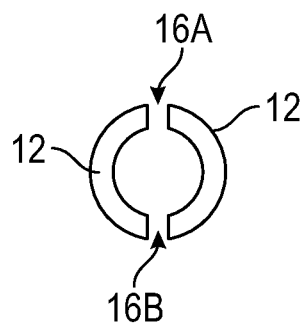
FIG. 3A shows a flange portion of a grommet in accordance with one of various embodiments.
Figure 3B:
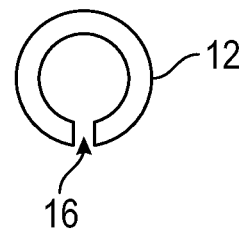
FIG. 3B shows a flange portion of a grommet in accordance with another of various embodiments.

FIGS. 3(A-B) show a flange portion 12 of a grommet in accordance with various embodiments. The flange can be configured with a notch 16, or optionally with two notches 16A; 16B, as shown. The notch(es) provide a means for receiving the hook or fixture and maintaining an orientation thereof about the perforated hardboard system. With two notches disposed about the flange, two distinct flange portions 12 are created. Each multi-notch flange portion provides a similar utility of a single-notch flange embodiment. The one or more notches provide the added utility of fixture stabilization.

Figure 4A:
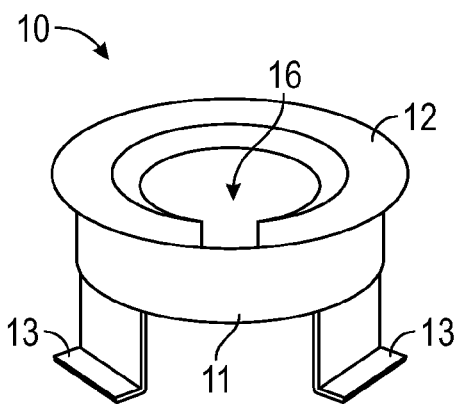
FIG. 4A shows a grommet in accordance with another embodiment.

FIG. 4A shows a grommet in accordance with another embodiment. The grommet 10 is shown having two tabs 13 extending from a rear side of the grommet body 11, and a flange 12 is shown extending form the body 11 at a front side thereof. The flange 12 is shown with a notch 16 disposed thereon.

Figure 4B:
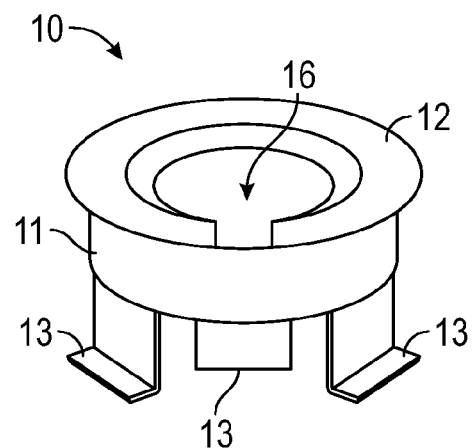
FIG. 4B shows a grommet in accordance with another embodiment.

FIG. 4B shows a grommet in accordance with another embodiment. The grommet 10 is shown having three tabs 13 extending from a rear side of the grommet body 11, and a flange 12 is shown extending form the body 11 at a front side thereof. The flange 12 is shown with a notch 16 disposed thereon.

Figure 4C:
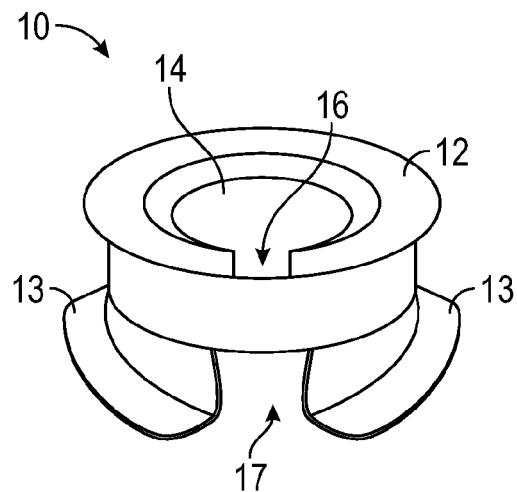
FIG. 4C shows a grommet in accordance with another embodiment.

FIG. 4C shows a grommet in accordance with another embodiment. The grommet 10 is shown having two large tabs 13 extending from a rear side of the grommet body 11, and a flange 12 is shown extending form the body 11 at a front side thereof. The flange 12 is shown with a notch 16 disposed thereon. An aperture 14 extends through the grommet and is configured to receive a hook or other fixture therethrough. Here, the large tabs are formed by etching a slit 17 through the rear side of the cylindrical body portion, such that the resulting large tabs extend substantially about the circumference of the grommet.

Figure 4D:
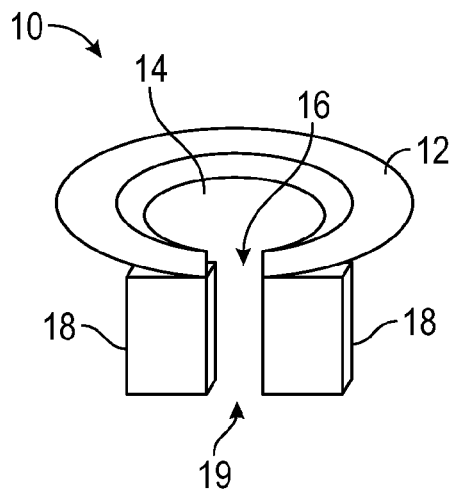
FIG. 4D shows a grommet in accordance with another embodiment.

FIG. 4D shows a grommet 10 in accordance with another embodiment. Here, the grommet includes a flange 12 and a pair of pinchers 18 extending downwardly from the flange at a position adjacent to the notch 16. A slot 19 is formed between the pinchers. In the instant embodiment, a hook or other fixture is inserted into the grommet and received at the notch and pinchers, the notch and pinchers securely fixing the hook or fixture in a desired orientation about the perforated hardboard system. An aperture 14 extends through the grommet and is configured to receive the hook or other fixture therethrough.

Figure 5:
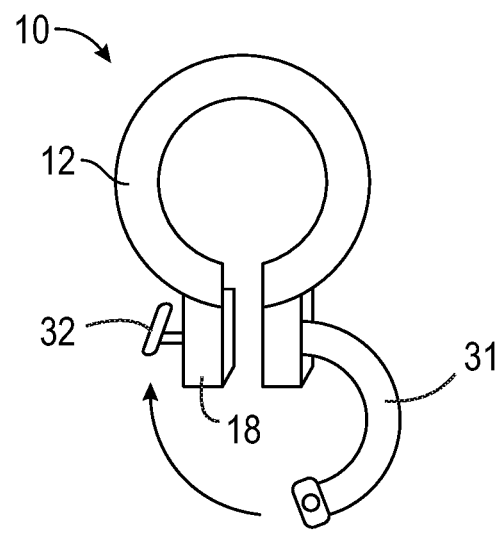
FIG. 5 shows a grommet in accordance with another embodiment.

FIG. 5 shows a grommet 10 in accordance with another embodiment. The flange further includes a strap 31 attached to the pinchers, the strap locks over the peg or fixture for added stabilization. The flange may include a notch for receiving the peg, hook, or fixture and retaining it securely in place. Pinchers are configured below the flange and adapted to receive the peg, hook or fixture snapped into a grooved slot of the pinchers. The strap is optional, and is positioned above the peg, hook or fixture inserted into the pinchers, the strap locks with a receiver 32 positioned on the other side of the pinchers.

Figure 6:
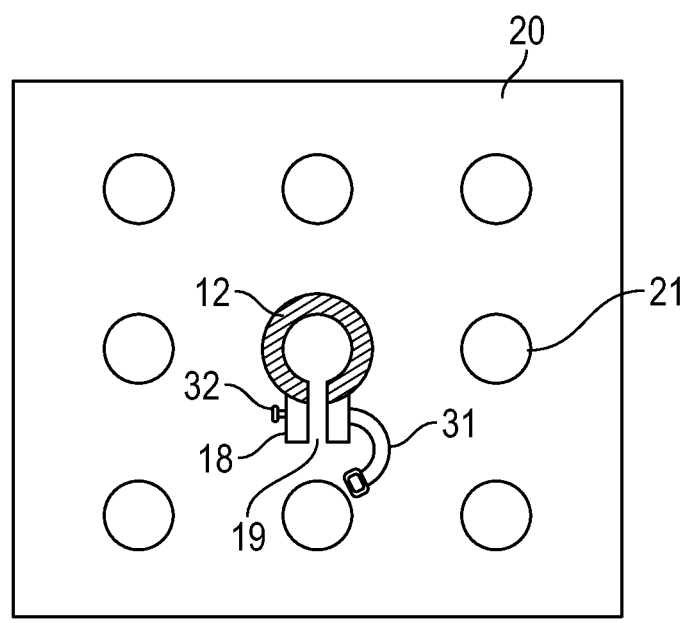
FIG. 6 shows the grommet of FIG. 5 installed in a hole of a perforated hardboard.

FIG. 6 shows the grommet of FIG. 5 installed in a hole of a perforated hardboard 20. The grommet includes a flange 12 and pinchers 18 separated by a slot 19. The strap 31 is configured to extend over the inserted peg or other fixture and attach with the receiver 32.

Figure 7:
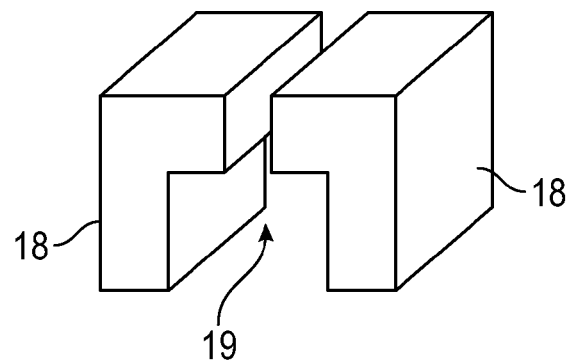
FIG. 7 shows a perspective view of pair of opposing pinchers of a grommet accessory.

FIG. 7 shows a perspective view of pair of opposing pinchers 18 of a grommet accessory in accordance with an embodiment. A slot 19 extends between the pinchers 18.

Figure 8:
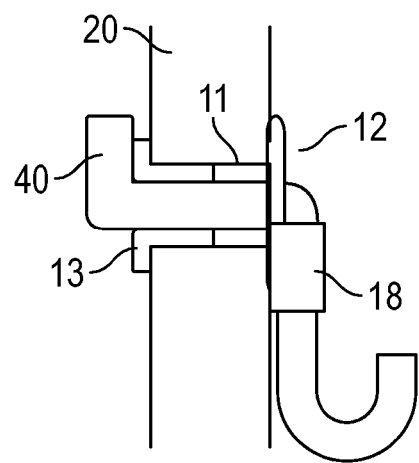
FIG. 8 shows a side view of a perforated hardboard system with a hook fixture installed in a grommet of the system.

FIG. 8 shows a side view of a perforated hardboard system with a hook fixture 40 installed in a grommet of the system. The grommet is shown having two tabs 13 extending from a rear side of the grommet body 11, and a flange 12 is shown extending form the body 11 at a front side thereof. The tabs and flange cooperate to grip the pegboard on opposing surfaces thereof. The grommet further comprises pinchers 18 extending downwardly from the flange and notch (See FIG. 9). The pinchers and notch are configured to receive the hook fixture 40 and secure it in place in a configuration with the perforated hardboard system.

Figure 9:
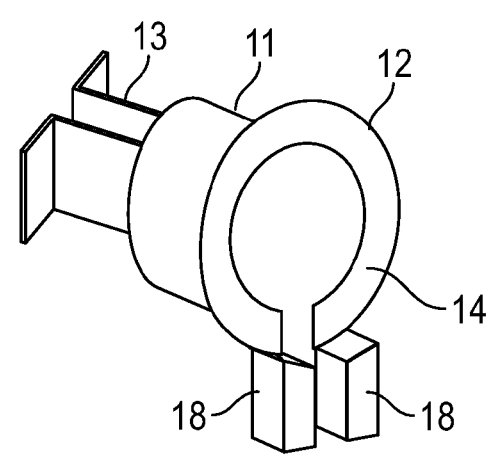
FIG. 9 shows a perspective view of the grommet accessory in accordance with the embodiment of FIG. 8.

FIG. 9 shows a grommet accessory in accordance with the embodiment of FIG. 8. The grommet is shown having two elongated tabs 13 extending from a rear side of the grommet body 11, and a flange 12 is shown extending form the body 11 at a front side thereof. The grommet further comprises pinchers 18 extending downwardly from the flange and notch. The opposing pinchers 18 and notch are configured to receive the hook fixture 40 and secure it in place in a configuration with the perforated hardboard system. The hook fixture is inserted through the aperture 14 of the grommet.

Figure 10:
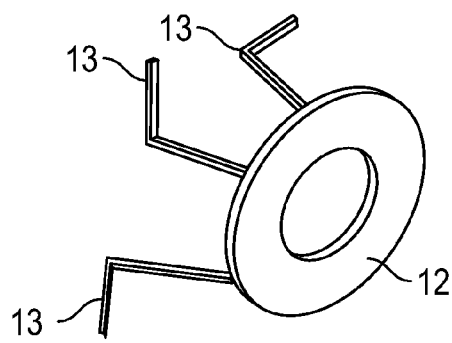
FIG. 10 shows a grommet accessory in accordance with another embodiment.

FIG. 10 shows a grommet accessory in accordance with another embodiment. Here, the grommet does not include a body. Instead, the grommet comprises a flange 12 and a plurality of securing elements, here tabs 13, extending from the flange along the longitudinal axis.

Figure 11A:
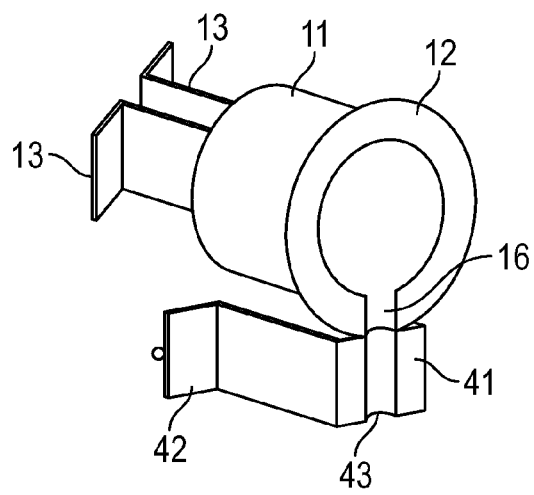
FIGS. 11(A-B) show a grommet accessory in accordance with yet another embodiment.
Figure 11B:
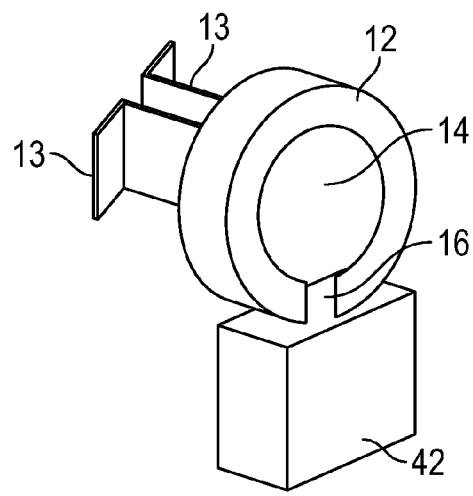

FIGS. 11(A-B) show a grommet accessory in accordance with yet another embodiment. The grommet is shown having two tabs 13 extending from a rear side of the grommet body 11, and a flange 12 is shown extending form the body 11 at a front side thereof. The grommet further comprises a lock box 41 extending downwardly from the flange 12 and notch 16. The lock box 41 and notch 16 are configured to receive a hook or other fixture and secure it in place in a configuration with the perforated hardboard system. The lock box 41 comprises a channel 43 for receiving the hook or fixture, and a locking lid 42 hingedly connected to the lock box and configured to cover the inserted hook or fixture. The locking lid 42 forms a frictional closure with the lock box 41. FIG. 11A shows the lock box in an open configuration with the locking lid 42 unlatched from the lock box. FIG. 11B shows the lock box 41 in a closed configuration with the locking lid 42 being frictionally engaged with the lock box.

Figure 12A:
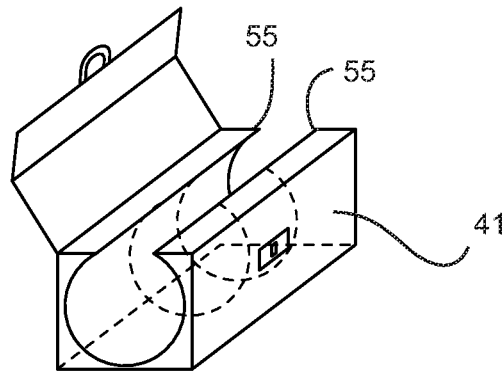
FIG. 12A shows the locking box in accordance with the embodiment of FIGS. 11(A-B).

FIG. 12A shows the locking box in accordance with the embodiment of FIGS. 11(A-B). Here, the locking box grommet is shown in further detail including jaws for receiving a hook or fixture therein.

Figure 12B:
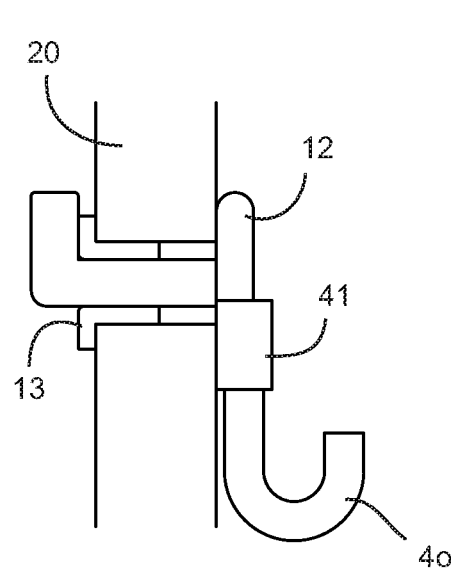
FIGS. 12(B-C) show a side view, and front view, respectively, of a hook accessory installed with a perforated hardboard system having a grommet disposed within a hole of the perforated hardboard.
Figure 12C:
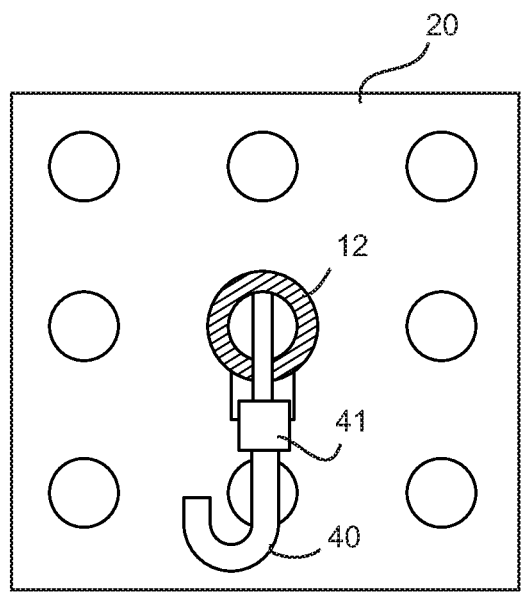

FIG. 12B shows a side view of the installed grommet and locking box of FIGS. 11A-11B, and 12A); whereas FIG. 12C shows a front view. Here, the grommet is installed in the perforated hardboard 20. The grommet includes a flange 12 and securing element tabs 13 configured to nest about opposing surfaces of the perforated hardboard. The lock box 41 extends downwardly from the grommet at the flange thereof.

While the above embodiments describe certain variations of a grommet for use with perforated hardboard systems, the following represents a presently preferred embodiment as illustrated in FIGS. 13(A-G).

Figure 13A:
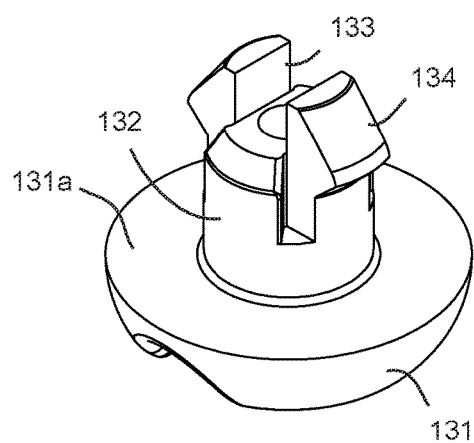
FIG. 13A shows a perspective view of a rear of a grommet in accordance with a preferred embodiment.

FIG. 13A shows a perspective rear view of a grommet in accordance with the preferred embodiment. The grommet comprises: a cylindrical body portion 132 extending along a longitudinal axis, the cylindrical body portion includes an annular cross section; a flange 131 positioned at a front of the cylindrical body; and one or more securing elements 133; 134 positioned at a rear of the cylindrical body. The securing elements include at least a first securing tab 133 disposed on a first side of the cylindrical body, and a second securing tab 134 disposed on a second side of the cylindrical body opposite the first side, both tabs disposed at the rear of the cylindrical body. The flange includes a planar surface 131a being perpendicular with a longitudinal axis extending through an aperture of the grommet (within the cylindrical body).

Figure 13B:
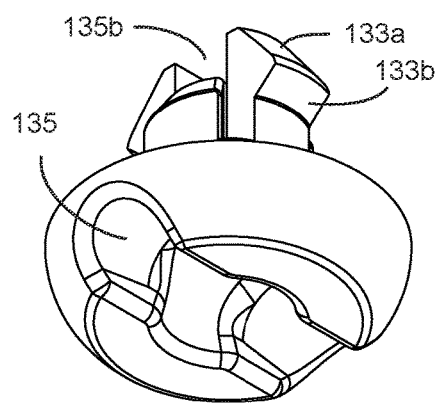
FIG. 13B shows a perspective view of a front of a grommet in accordance with the preferred embodiment.

FIG. 13B shows a perspective view of a front of a grommet in accordance with the preferred embodiment. The securing tabs include a first angled surface 133a and a second angled surface 133b. In this regard, the first angled surface is configured to contact the hole upon insertion of the grommet therethrough, and the second angled surface is configured to contact the rear surface of the perforated hardboard once the grommet is inserted into the hole. Also, the second angled surface provides for easy removal of the grommet from the perforated hardboard. A channel 135 extends along a front face of the flange and is configured to receive and secure at least a portion of a hook or fixture therein.

Figure 13C:
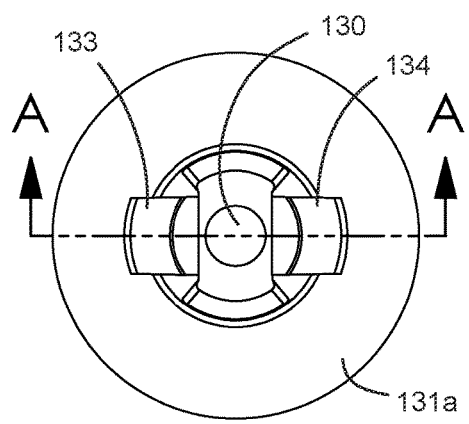
FIG. 13C shows a rear plan view of the grommet with an indicated section line A-A.

FIG. 13C shows a rear plan view of the grommet with an indicated section line A-A. The grommet includes securing tabs 133; 134 positioned on either side of aperture 130, and planar flange surface 131a.

FIG. 13A shows a perspective rear view of a grommet in accordance with the preferred embodiment. The grommet comprises: a cylindrical body portion 132 extending along a longitudinal axis, the cylindrical body portion includes an annular cross section; a flange 131 positioned at a front of the cylindrical body; and one or more securing elements 133; 134 positioned at a rear of the cylindrical body. The securing elements include at least a first securing tab 133 and a second securing tab 134 disposed opposite the first securing tab, both tabs disposed at the rear of the cylindrical body. A space disposed between the first and second securing tabs forming a second channel 135b. The flange includes a planar surface 131a being perpendicular with a longitudinal axis extending through an aperture of the grommet (within the cylindrical body).

Figure 13D:
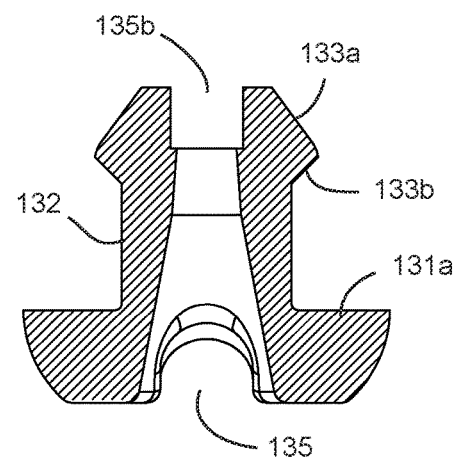
FIG. 13D shows a section of the grommet of the preferred embodiment in accordance with the section A-A.
Figure 13E:
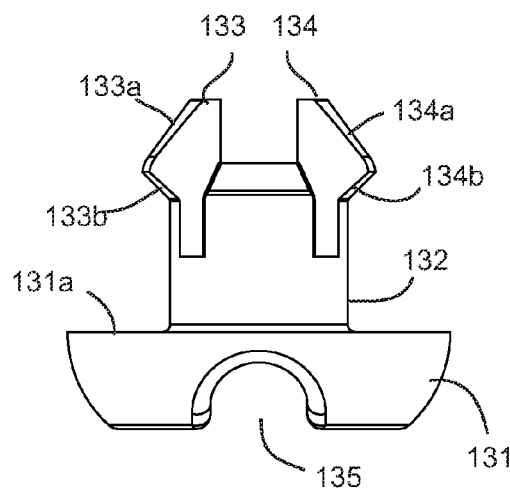
Figure 13F:
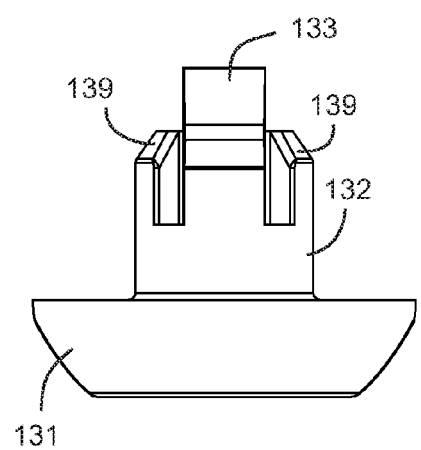
FIG. 13F shows a side view of the grommet in accordance with the preferred embodiment.

FIG. 13E shows a top view of the grommet in accordance with the preferred embodiment. Here, the grommet includes a flange 131 having a channel 135 extending along a face of the flange. The grommet further includes a cylindrical body 132 extending from a planar flange surface 131a to a rear side where a first securing element, here a tab 133, and a second securing element, also a tab 134, are each disposed on opposite sides of one another. Each of the respective tabs includes a first angled surface 133a; 134a, and a second angled surface 133b; 134b, respectively.

FIG. 13D shows a section of the grommet of the preferred embodiment in accordance with the section A-A. Note the securing elements include a first angled surface 133a and a second angled surface 133b, the grommet further includes a channel 135 also may be referred to as the "first channel"), planar flange surface 131a, and cylindrical body 132 as shown. Moreover, the space between first and second securing tabs can be referred to as the "second channel 135b".

Figure 13G:
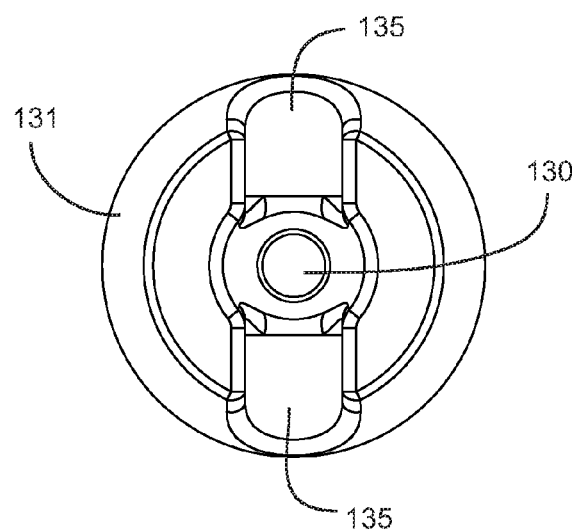
FIG. 13G shows a front plan view of the grommet in accordance with the preferred embodiment.
Figure 13H:
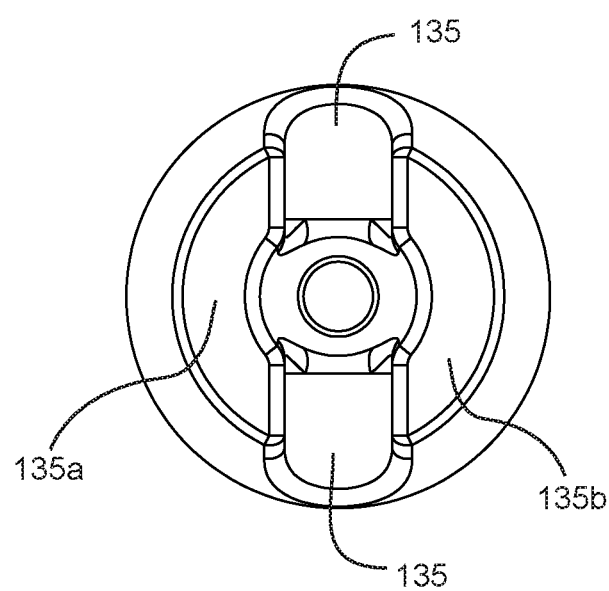

FIG. 13G shows a front plan view of the grommet in accordance with the preferred embodiment. Here, the aperture 130 is depicted at a center of the grommet, as shown the aperture includes a first diameter at the front and a second diameter at the rear, wherein the second diameter is less than the first diameter. In this regard, the tapered aperture described narrows from front to rear to allow for easier insertion of a hook or fixture, whereas the same tapered aperture provides a frictional resistance and gripping during removal of the hook or fixture in the reverse direction. A longitudinal axis extends through the aperture at a center thereof. A channel 135 is shown disposed along a front face of the flange 131 along a diameter thereof. The channel is configured to cooperate with the aperture to receive and support a hook or fixture therein.

Figure 14A:
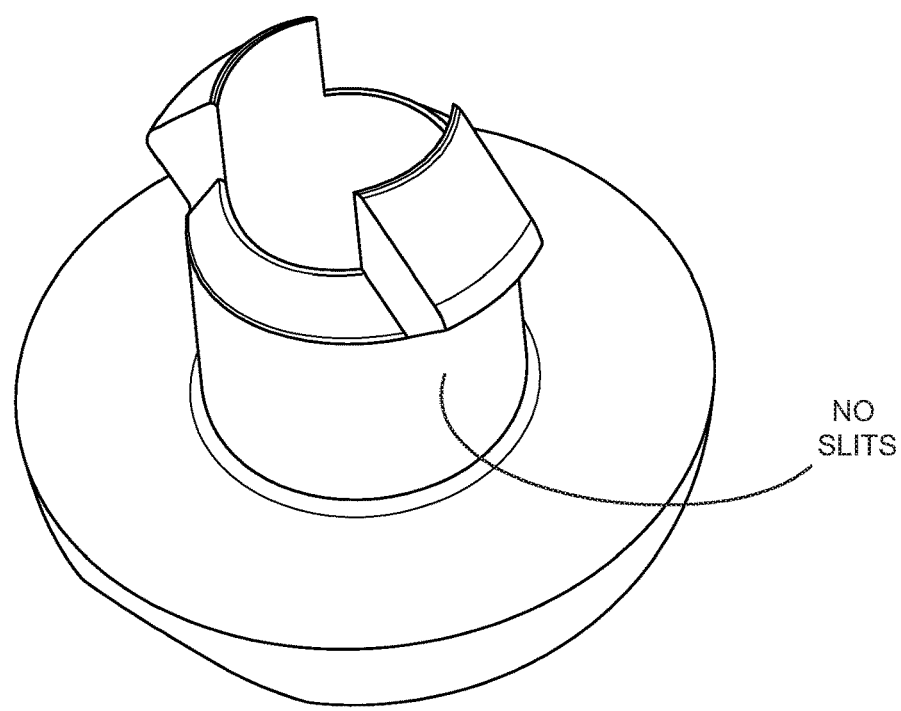
FIG. 14A shows an embodiment wherein the securing element is fixed with the cylindrical body.
Figure 14B:
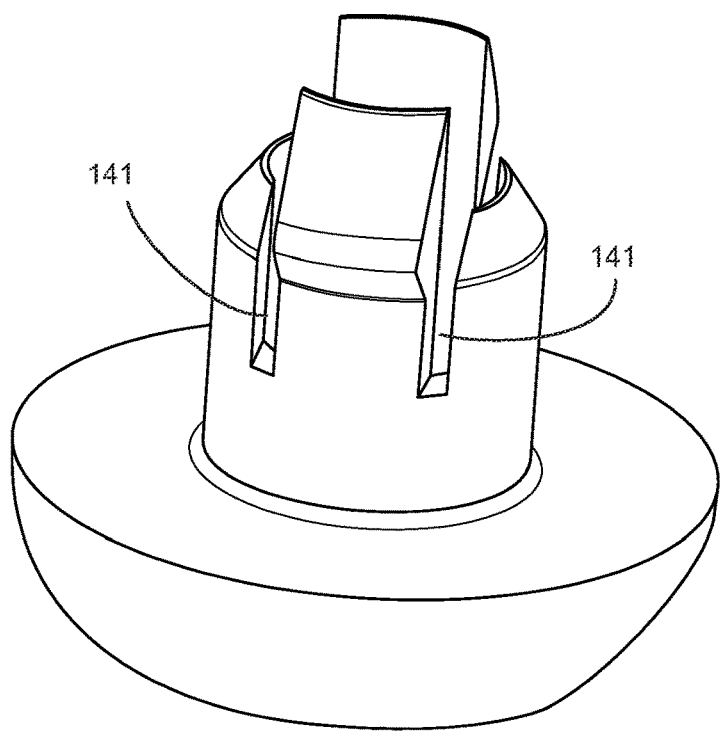
FIG. 14B shows an embodiment where the securing element is separated from the cylindrical body by a pair of slots disposed along either side of the securing element, resulting in a flexible securing element extending into a body portion of the grommet.

Finally, as shown in FIGS. 14(A-B), the grommet of the preferred embodiment may optionally include slits 141 disposed through at least a portion of the cylindrical body such that the resulting securing element tabs may be configured to translate inwardly, with an outward bias, such that as the grommet is inserted into a hole of a perforated hardboard system, the tabs are deflected inward by the first angled surfaces of each tab, and then biased to return outwardly to a rest state where at least a portion of the second angled surface of the respective tabs is adapted to engage a rear surface of the perforated hardboard for retaining the grommet in the hole. FIG. 14A shows the grommet without slits, whereas FIG. 14B shows the grommet with slits.

In certain embodiments, the grommet may be molded from a plastic material, such as injection molded or otherwise. In this regard, the grommet, including the cylindrical body, flange, and securing elements thereof, may form a monolithic single molded piece.

FIG. 13 H shows a front plan view of the grommet in accordance with the embodiment illustrated in FIG. 13G. Further illustrated are first portion 135*a* and second portion 135*b* of the channel 135.

In some embodiments, the grommet can be configured for use with two different hole sizes of perforated hardboards. For example, the cylindrical body can have a first outer diameter for nesting within a ¼" inch hole; whereas the securing tabs can be configured with a length to contact a rear surface of the pegboard for use with 9/32" holes.

In other embodiments, the front part of the aperture of the grommet comprises a wider "lead-in" to help guide the insertion process for the peg or hook into the grommet.

In certain embodiments, the grommet can be manufactured in any color, or combination of colors by way of molding from a plastic with a desired pantone, or otherwise painting or colorizing the molded material.

Now, although a various embodiments have been shown and described to practice a grommet accessory for use with a perforated hardboard, it will be recognized by those with skill in the art that certain variations and other configurations can be practiced which are considered to be within the spirit and scope of the invention. Accordingly, the illustrated embodiments are intended to be enabling-only and not limiting in any way.

I claim:

1. A grommet for use with a perforated hardboard system, the perforated hardboard system including a perforated hardboard having a plurality of holes extending through a surface thereof, and one or more hooks or fixtures each configured for mounting about one or more of the plurality of holes, the grommet comprising:
    a cylindrical body portion;
        the cylindrical body portion having an annular cross-section extending along a longitudinal axis from a first side to a second side thereof, wherein the annular cross-section includes:
            an outer diameter configured to fit within one of the holes of the perforated hardboard, and
            an inner diameter configured to receive and retain one of the hooks or fixtures;
    a rigid stopping flange;
        the rigid stopping flange attached to the cylindrical body portion at the first side thereof, the stopping flange extending radially outward from the first side of the cylindrical body portion in a direction perpendicular to the longitudinal axis thereby defining a planar flange surface and further extending longitudinally away from the cylindrical body to form a thickness of the rigid stopping flange, the rigid stopping flange including:
            an aperture, the aperture extending through the rigid stopping flange and the cylindrical body portion along the longitudinal axis; and
            a first channel, the first channel extending along a diameter of the rigid stopping flange and intersecting the longitudinal axis of the cylindrical body portion, the first channel being configured to receive at least a first portion of the hook or fixture therein for maintaining an orientation of the hook or fixture relative to the grommet; and
    a rear securing element;
        the rear securing element configured for securing the second side of the grommet to a rear surface of the perforated hardboard, the rear securing element forming a second channel, wherein the second channel is configured to receive at least a second portion of the hook or fixture therein for further maintaining the orientation of the hook or fixture relative to the grommet;
    wherein the grommet is configured for integration with one of the holes of the perforated hardboard for providing protection against wear of the respective hole, and
    wherein the first and second channels are further configured for maintaining the orientation of the hook or fixture relative to the perforated hardboard; and
    wherein the first channel extends into the thickness of the rigid stopping flange toward the cylindrical body portion at a depth along the longitudinal axis adjacent to the planar flange surface.

2. The grommet of claim 1, said rear securing element comprising a first securing tab and a second securing tab.

3. The grommet of claim 1, said rigid stopping flange including a planar flange surface configured to abut a front surface of the perforated hardboard.

4. The grommet of claim 1, said cylindrical body portion comprising a first portion having a first outer diameter associated therewith, and a second portion, the second portion having a second diameter that is less than the first diameter.

5. The grommet of claim 4, said rear securing element comprising a circular flap, wherein the circular flap is configured to fold over the second portion upon inserting the grommet into the hole, and wherein the circular flap is biased to engage a rear surface of the perforated hardboard upon installation of the grommet.

6. The grommet of claim 2, each of said first and second securing tabs including a first angled surface and a second angled surface.

7. The grommet of claim 6, said cylindrical body portion comprising slits disposed on each side of the first and second securing tabs, wherein the securing tabs are each configured to flex inward into a lumen space of the grommet upon insertion into the hole of the perforated hardboard, and wherein the securing tabs are biased to return to a rest state once extending beyond the hole on the second side, wherein the second angled surface is configured to contact a rear surface of the perforated hardboard for securing the grommet therewith.

8. The grommet of claim 1, wherein the cylindrical body portion includes a fillet disposed about at least a portion of the circumference thereof at the second side.

9. A grommet for use with a perforated hardboard system, the perforated hardboard system including a perforated hardboard having a plurality of holes being disposed through a surface thereof, and one or more hooks or fixtures each configured for mounting about one or more of the plurality of holes, the grommet comprising:
   a cylindrical body portion,
      the cylindrical body portion having an annular cross-section extending along a longitudinal axis from a first side to a second side thereof; and
   a rigid stopping flange,
      the rigid stopping flange attached to the cylindrical body portion at the first side thereof, the stopping flange extending radially outward from the first side of the cylindrical body portion in a direction perpendicular to the longitudinal axis thereby defining a planar flange surface and further extending longitudinally away from the cylindrical body to form a thickness of the rigid stopping flange, the rigid stopping flange further comprising:
      an aperture extending through the rigid stopping flange and the cylindrical body portion along the longitudinal axis, and
      a first channel extending along a diameter of the rigid stopping flange perpendicular to the longitudinal axis, the first channel intersecting through the aperture;
   wherein the cylindrical body portion and rigid stopping flange of the grommet are configured for insertion and nesting with one of the holes of the perforated hardboard for providing protection against wear of the hole, and
   wherein the first channel is configured to secure orientation of one of said hooks or fixtures therein, and
   wherein the first channel extends into the thickness of the rigid stopping flange toward the cylindrical body portion.

10. The grommet of claim 9, further comprising a rear securing element coupled to the cylindrical body portion at the second side thereof, the rear securing element configured for securing the second side of the grommet to a rear surface of the perforated hardboard.

11. The grommet of claim 1, said rigid stopping flange further comprising a planar flange surface configured to abut a surface of the perforated hardboard when the grommet is installed therein, wherein the first channel is positioned about the stopping flange at a side opposite the planar flange surface.

12. The grommet of claim 2, wherein a space disposed between the first and second securing tabs defines the second channel, the second channel aligned parallel with respect to the first channel.

13. The grommet of claim 12, wherein each of the first and second securing tabs further comprises a first angled surface and a second angled surface that is distinct from the first angled surface; wherein the first and second surfaces are configured to guide force for inserting and releasing the grommet from the respective hole of the pegboard.

14. The grommet of claim 4, said cylindrical body portion comprising a first inner diameter at the first side and a second inner diameter at the second side, wherein the second inner diameter is less than the first inner diameter thereby forming a tapered lumen.

15. A grommet for use in a perforated hardboard system, the grommet comprising:
   a cylindrical body portion, a flange, and a pair of securing elements;
   the cylindrical body portion comprising:
      an annular cross section extending from a first side to a second side along a longitudinal axis, the annular cross section being smaller at the second side than at the first side thereby forming a tapered hole;
   the flange being disposed at the first side of the cylindrical body and further comprising:
      a first channel, the first channel extending along a diameter of the flange and intersecting the longitudinal axis of the cylindrical body,
      the first channel further comprising a depth associated therewith, the depth spanning the diameter and extending along the longitudinal axis into a thickness of the rigid stopping flange;
   the pair of securing elements disposed at the second side of the cylindrical body and spaced apart to form a second channel therebetween;
   wherein each of the first and second channels is oriented parallel with respect to one another and is individually configured to receive at least a portion of a hook or fixture and secure an orientation thereof relative to the grommet; and
   wherein the first channel comprises a rounded surface configured to contour a body of a hook or fixture when integrated with the grommet.

* * * * *